O. W. JOHNSON.
MOLDING MACHINE.
APPLICATION FILED SEPT. 30, 1911.
1,068,662.
Patented July 29, 1913.
7 SHEETS—SHEET 3.
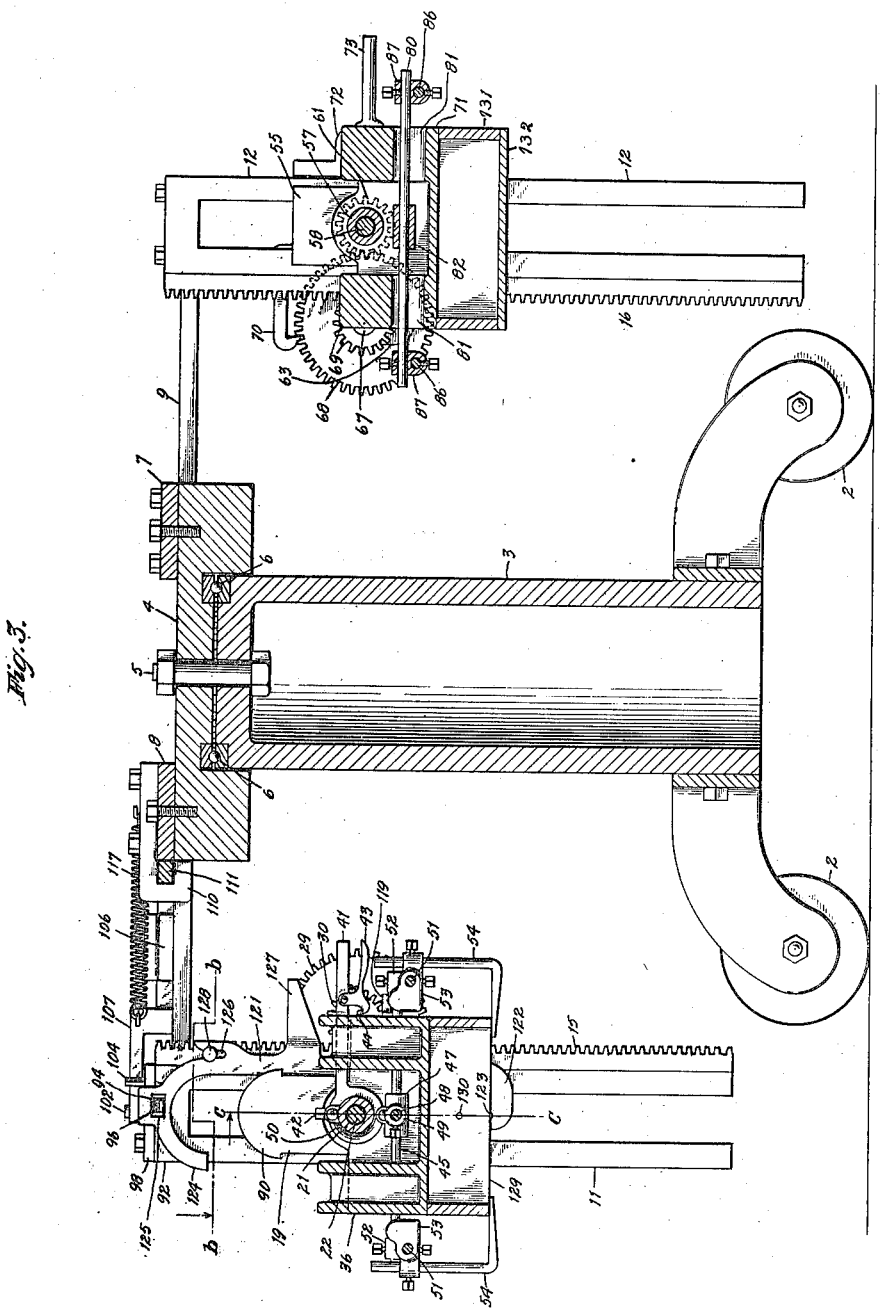
Witnesses:
W. L. Dow.
E. Behel.
Inventor:
Oscar W. Johnson
By A. O. Behel
Atty O. W. JOHNSON.
MOLDING MACHINE.
APPLICATION FILED SEPT. 30, 1911.
1,068,662.
Patented July 29, 1913.
7 SHEETS—SHEET 4.
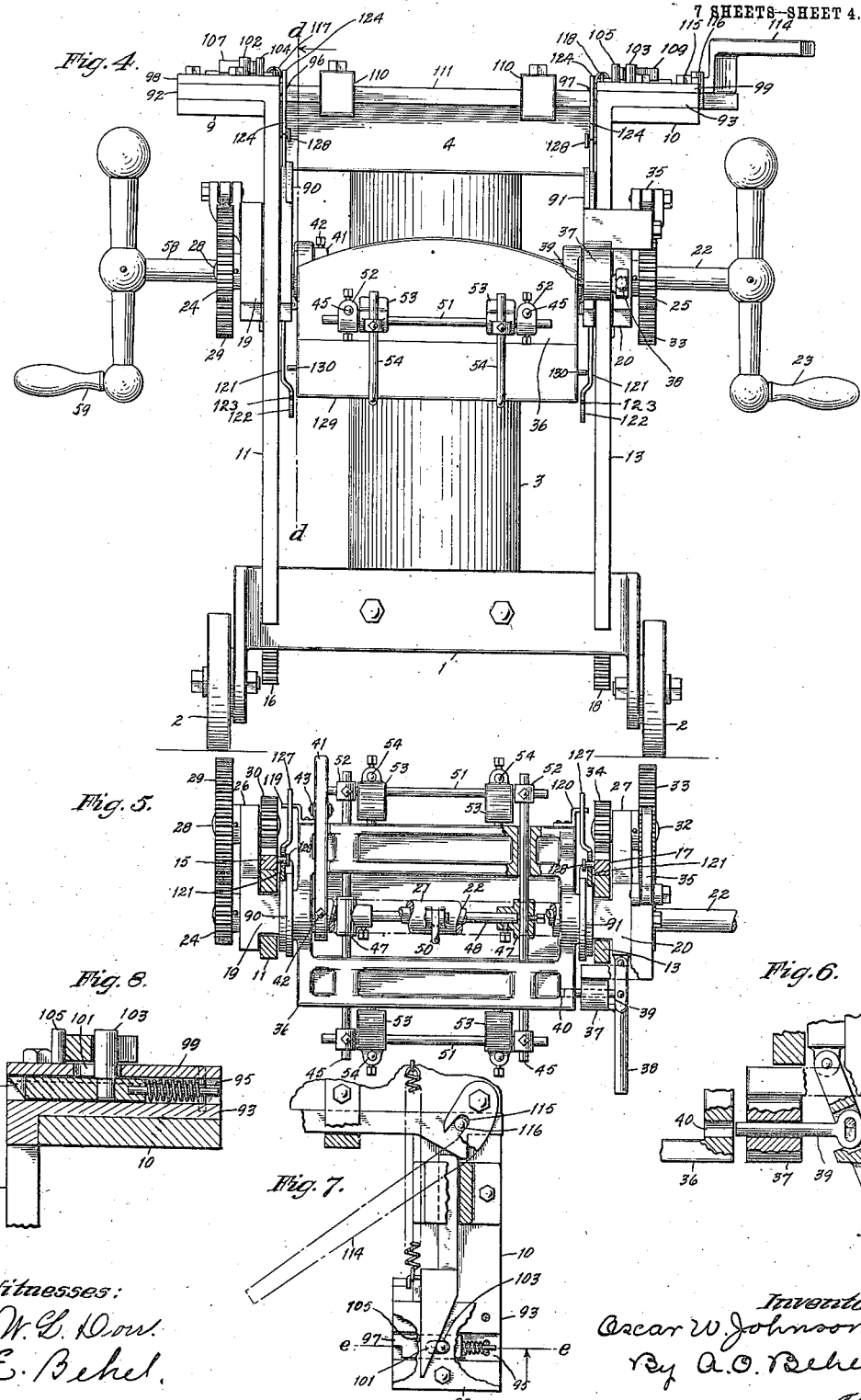

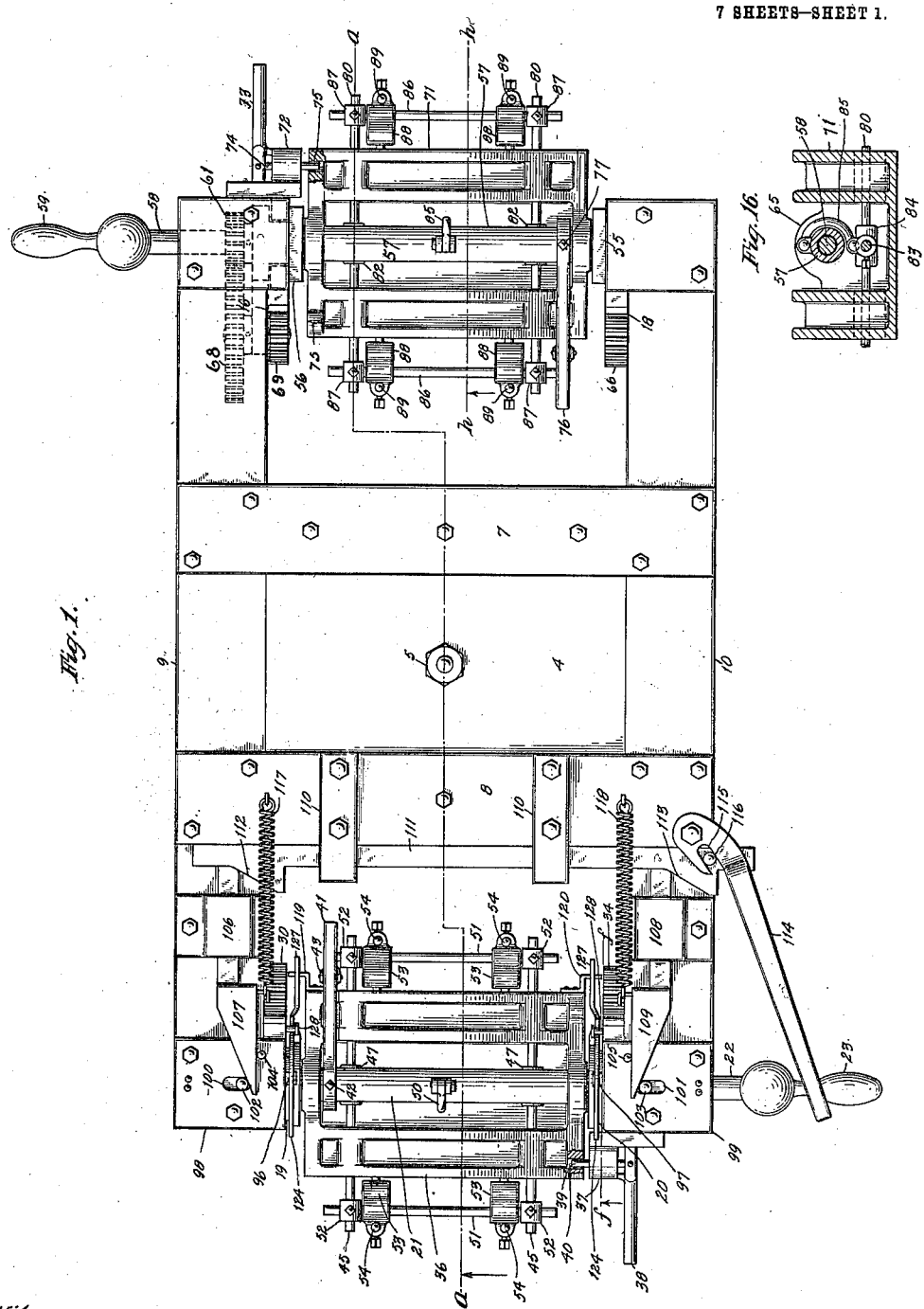

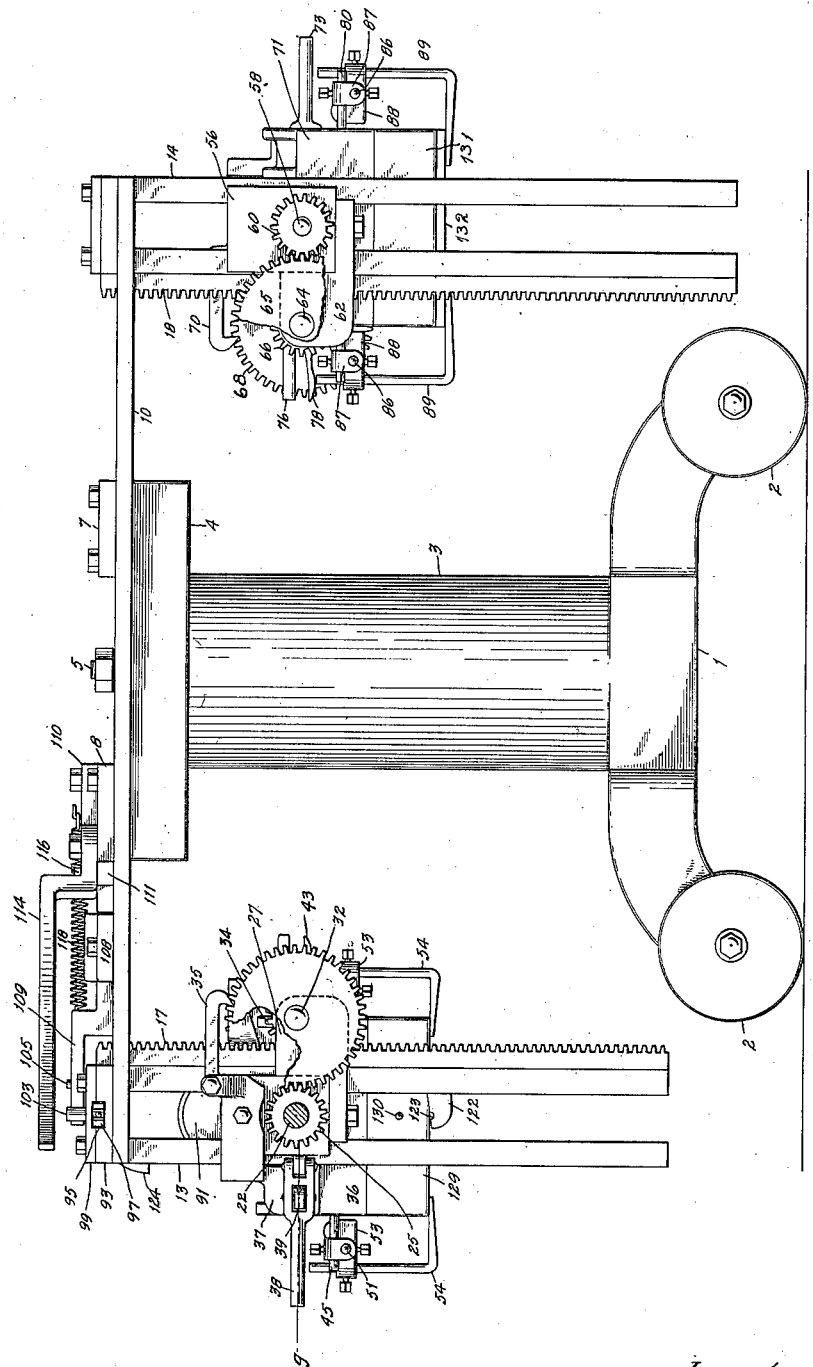

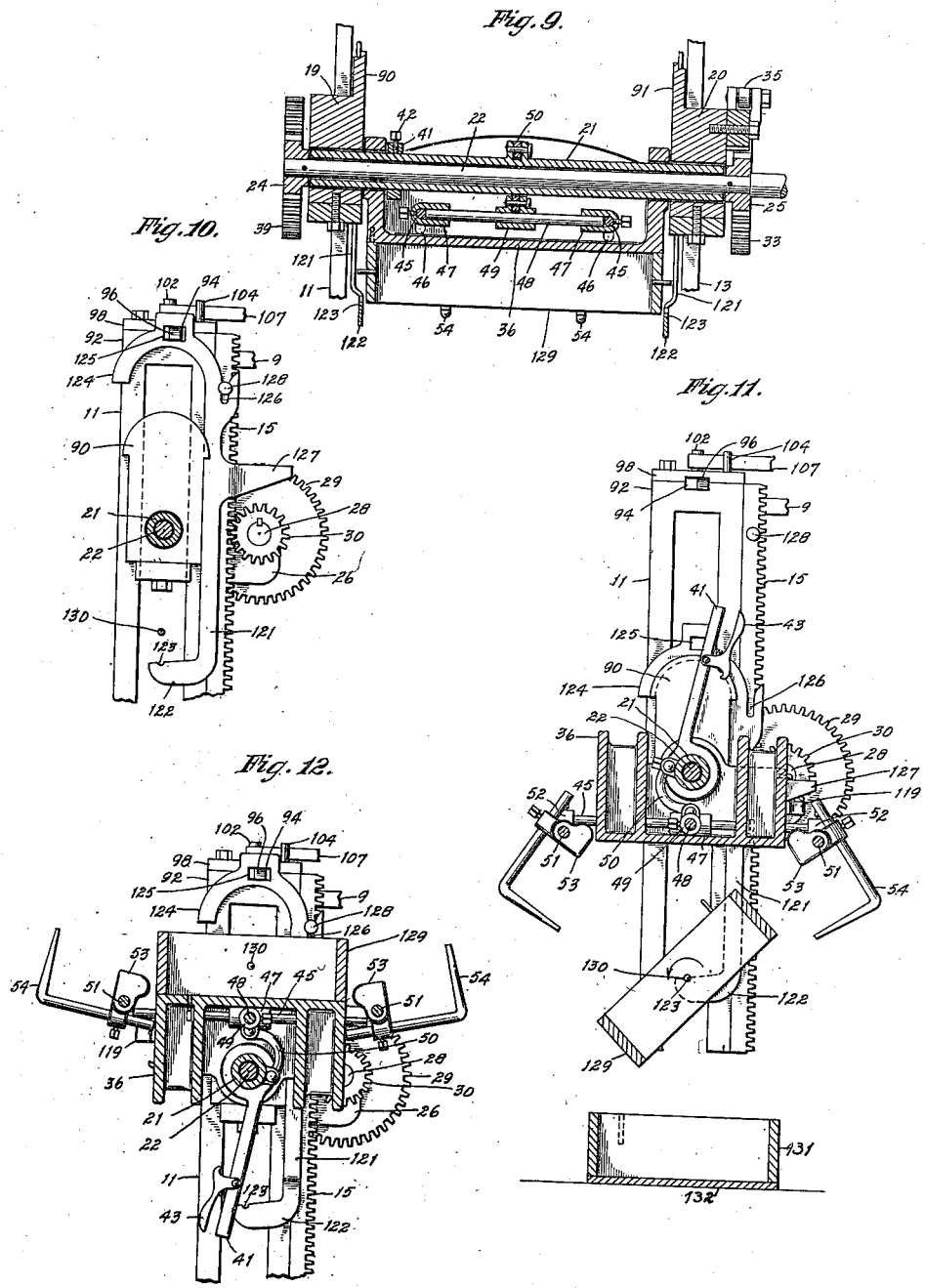

O. W. JOHNSON.
MOLDING MACHINE.
APPLICATION FILED SEPT. 30, 1911.

1,068,662.

Patented July 29, 1913.
7 SHEETS—SHEET 6.

Witnesses:
W. L. Dow
E. Behel

Inventor:
Oscar W. Johnson
By A. O. Behel
Atty.

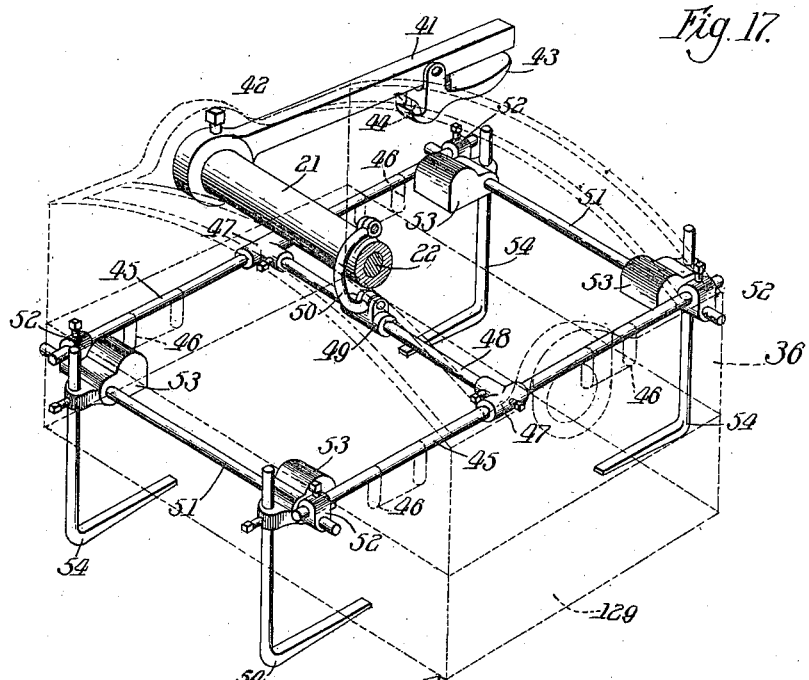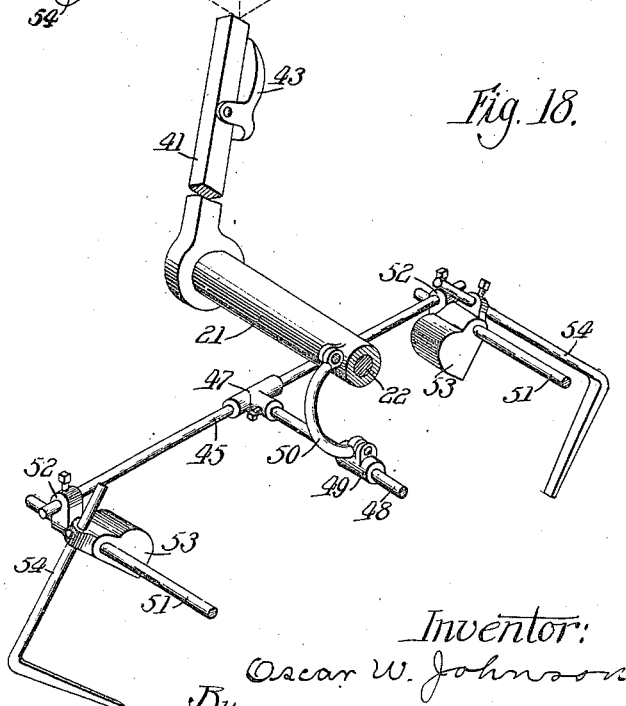

UNITED STATES PATENT OFFICE.

OSCAR W. JOHNSON, OF ROCKFORD, ILLINOIS, ASSIGNOR TO WARD PUMP COMPANY, OF ROCKFORD, ILLINOIS, A CORPORATION OF ILLINOIS.

MOLDING-MACHINE.

1,068,662.

Specification of Letters Patent.

Patented July 29, 1913.

Application filed September 30, 1911. Serial No. 652,206.

*To all whom it may concern:*

Be it known that I, OSCAR W. JOHNSON, a citizen of the United States, residing at Rockford, in the county of Winnebago and State of Illinois, have invented certain new and useful Improvements in Molding-Machines, of which the following is a specification.

The object of this invention is to construct a machine for handling the flasks employed in sand molding.

Figure 13:
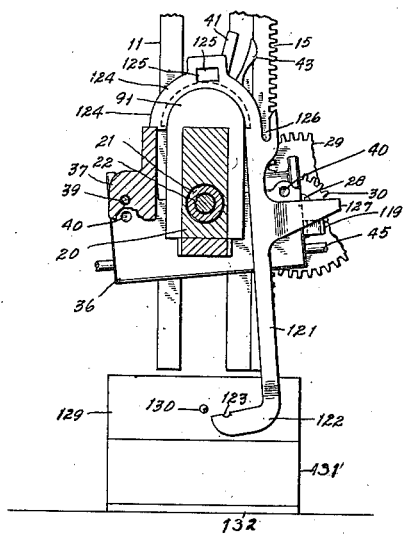
Figure 14:
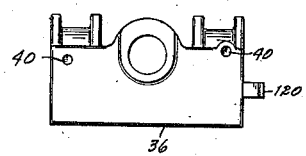
Figure 15:
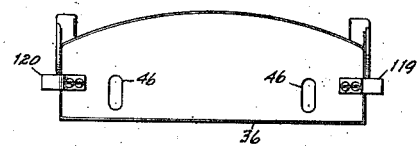

In the accompanying drawings, Figure 1 is a plan view of my improved molding machine. Fig. 2 is a side elevation. Fig. 3 is a vertical section on dotted line $a\ a$ Fig. 1. Fig. 4 is an end elevation. Fig. 5 is a section on dotted line $b\ b$ Fig. 3. Fig. 6 is a section on dotted line $g$ Fig. 2. Fig. 7 is a partial plan and partial section of one end of the molding machine. Fig. 8 is a section on dotted line $e\ e$ Fig. 7. Fig. 9 is a section on dotted line $c\ c$ Fig. 3. Fig. 10 is a section on dotted line $d\ d$ Fig. 4. Fig. 11 is a section on dotted line $a\ a$ Fig. 1. Fig. 12 is a section on dotted line $a\ a$ Fig. 1 the parts being shown in different positions. Fig. 13 is a section on dotted line $f\ f$ Fig. 1. Fig. 14 is an end view of one of the platens. Fig. 15 is a side view of one of the platens. Fig. 16 is a section on dotted line $h\ h$ Fig. 1. Fig. 17 is a view in perspective of the locking means for the flask, the flask and platen being shown diagrammatically. Fig. 18 is a fragmentary view showing the locking means released.

My improvements are supported upon the base 1 which is supported upon the wheels 2. A pedestal 3 is fixedly connected to the base, and on the upper end of this pedestal is located a head-plate 4, and is connected thereto by the pivot bolt 5. Balls 6 form an antifriction support between the head-plate and pedestal. To the upper face of the head-plate are secured plates 7 and 8. To the ends of these plates are secured two plates 9 and 10. Four vertically slotted bars 11, 12, 13 and 14 depend from the four free ends of the bars 9 and 10, and each of these four slotted bars is provided with a vertically arranged toothed rack 15, 16, 17 and 18 respectively.

Within the vertical slots of the bars 11 and 13 are located guides 19 and 20 respectively and a sleeve 21 is loosely mounted in these guides. A shaft 22 is supported within the sleeve 21 and to one end is connected a crank 23. To this shaft is secured two spur-gears 24 and 25. The guides 19 and 20 have projections 26 and 27 respectively, Fig. 5, extending laterally therefrom. The projection 26 supports a stub-shaft 28, and to this stub-shaft are secured two spur-gears 29 and 30. The spur-gear 29 meshes with the spur-gear 24 secured to the shaft 22, and the spur-gear 30 meshes with the rack 15.

The projection 27 supports a stub-shaft 32, and to this stub-shaft are secured two spur-gears 33 and 34. The spur-gear 33 meshes with the spur-gear 25 secured to the shaft 22, and the spur-gear 34 meshes with the rack 17. A dog 35 is pivotally connected to the guide 20 and engages the teeth of the spur-gear 33.

A platen 36 is suspended by the sleeve 21 and is capable of an oscillatory movement thereon. From the guide 20 extends a lateral projection 37, Fig. 6, to which is pivoted a lever 38. To this lever 38 is pivoted a plunger 39 located in the projection 37 and adapted to enter one of the openings 40 in the platen 36 when the platen is in a horizontal position, thereby holding it against oscillation.

To the sleeve 21 is connected a lever 41 by the set screw 42. This lever has a latch 43 pivotally connected to it, and which engages a hooked projection 44 extending from the platen 36.

Two rods 45, Figs. 5 and 17, extend transversely through the openings 46 in the platen and to each rod is connected a coupling 47 and these couplings are connected by a rod 48 to the center of which is connected a collar 49. A curved link 50 has one end pivotally connected to the collar 49 and its other end is pivotally connected to the sleeve 21. Rods 51 are connected to the rods 45 by the clamps 52. Each of the rods 51 support two weighted arms 53, and each weighted arm has a hook 54 adjustably connected to it.

Within the vertical slots of the bars 12 and 14 are located guides 55 and 56 respectively, and a sleeve 57 is loosely mounted in these guides, a shaft 58 is supported within the sleeve 57 and to one end is connected a crank 59. To this shaft are secured two spur gears 60 and 61. The guides 55 and 56 have projections 62 and 63 respectively extending laterally therefrom. The projection 62 supports a stub-shaft 64, and to this stub-shaft are secured two spur gears 65 and 66. The spur-gear 65 meshes with the spur gear 60 secured to the shaft 58, and the spur-gear 66 meshes with the rack 18.

The projection 63 supports a stub-shaft 67, and to this stub-shaft are secured two spur-gears 68 and 69. The spur gear 68 meshes with the spur-gear 61 secured to the shaft 58 and the spur gear 69 meshes with the rack 16. A dog 70 is pivotally connected to the guide 55 and engages the teeth of the spur-gears 68.

A platen 71 is suspended by the sleeve 57 and is capable of an oscillatory movement thereon. From the guide 56, Fig. 1, extends a lateral projection 72 to which is pivoted a lever 73. To this lever 73 is pivoted a plunger 74 located in the projection 72, and adapted to enter one of the openings 75 in the platen 71 when the platen is in a horizontal position, thereby holding it against oscillation.

To the sleeve 57 is connected a lever 76 by the set-screw 77. This lever has a latch 78, Fig. 2, pivotally connected to it, and which engages a hooked projection similar to the projection 44 extending from the platen 36 shown in Fig. 3.

Two rods 80 extend through the openings 81, Fig. 3, in the platen, and to each rod is connected a coupling 82 and these couplings are connected by a rod 83 to the center of which is connected a collar 84. A curved link 85 has one end pivotally connected to the collar 84 and its other end is pivotally connected to the sleeve 57. Rods 86 are connected to the rods 80 by the clamps 87. Each of the rods 86 supports weighted arms 88 and each weighted arm has a hook 89 adjustably connected to it.

From the guides 19 and 20 extend projections 90 and 91 respectively.

The upper ends 92 and 93 of the slotted bars 11 and 13 respectively are turned at right angles to the vertical portions of the bars and overlie the ends of the plates 9 and 10 respectively. These ends 92 and 93, Fig. 8, are each formed with a slot 94 and 95 respectively within which are located spring actuated dogs 96 and 97 respectively.

Over the ends 92 and 93 are located plates 98 and 99 respectively and each is provided with a slot 100 and 101 respectively through which pins 102 and 103 connected with the dogs 96 and 97 project. From the plates 98 and 99 extend pins 104 and 105 respectively. To the plate 9 is secured a guide way 106 which serves as a support for the pointed bar 107. This bar rests in contact with the pin 104, and its inclined face rests against the pin 102.

To the plate 10 is secured a guide way 108 which serves as a support for the pointed bar 109. This bar rests in contact with the pin 105, and its inclined face rests against the pin 103. To the bar 8 are secured guide-ways 110 which support a slidable bar 111. This bar is formed with two inclined sections 112 and 113.

To the plate 8 is pivoted a lever 114 which is formed with a slot 115 near its pivot and a pin 116 extending from the bar 111 is located in this slot.

Springs 117 and 118 have one end of each connected to the plate 8 and the other ends of these springs are connected to the pointed bars 107 and 109 respectively. The action of these springs is to hold the pointed bars in contact with the slidable bar 111 as shown at Fig. 1.

From one side of the platen 36 extends two projections 119 and 120, Fig. 1.

Two carriers, Figs. 10 and 11, are employed to support the upper portion of the flask 129, the same reference numerals being applied to both, and each comprising the vertical portion 121 provided with a lengthwise extending slot 126, the lower hooked end 122 provided with a notch 123, an upper hooked end 124 provided with an opening 125, and a projection 127 extending laterally from the vertical portion 121. Pins 128 extend from the racks 15 and 17 and are adapted to be received within slots 126 of the carriers. The upper section 129 of the flask has two studs 130.

In use the platen 71 is faced upward and will be held in this position by the plunger 74 entering one of the openings 75 in the platen; platen 71 assuming a position similar to that of platen 36 in Fig. 12.

The lower section 131 of the flask is placed on the platen 71, and is filled with sand in the usual manner. The lower plate 132 is then placed over this section of the flask, and the hooks 89 are placed over this plate. The lever 76 is then given a partial turn which will oscillate the sleeve 57, and through the link 85 the hooks will be held in contact with the lower plate 132. The plunger 74 is then withdrawn from its engagement with the platen, and the platen given a half revolution which will force the bottom plate down as shown at Fig. 2. The plunger is then moved into engagement with the platen which will hold it in its horizontal position. The dog 70 is then disengaged from the spur gear 68, and by means of the crank 59 the platen is lowered by reason of the spur-gears 66 and 69 moving in engagement with the racks 18 and 16 respectively, until the flask section rests on the ground. The lever 76 is then moved which will release the hooks 89 and the weights 88 will hold the hooks free of the flask section, as is similarly shown in Fig. 18. The platen is then raised and turned back into its horizontal position with its flat face upward when it is ready for another lower flask section. While the lower flask section is being filled, the upper flask section 129 is being filled on the platen 36, Fig. 12, and after the lower flask section has been placed on the floor, the ends of the molding machine are turned end for end by revolving on the standard 3, which will bring the upper flask section over the lower flask section. The lever 41 is then raised, the hooked arms 54 gripping flask 129. The plunger 39 is withdrawn from the opening 40 and the whole platen 36 is oscillated, bringing the flask 129 face downward, as in Fig. 3. The upper flask section is lowered until the studs 130 rest in the notches 123 of the supports 121, Fig. 11, when the hooks 54 are disengaged from the upper flask section. The platen is then raised free of the upper flask section and the upper flask section will be suspended by the supports 121, and the supports will be held in the positions shown at Fig. 10, by the dogs 96 and 97 entering the openings 125. In raising the platen the upper ends of the guides 90 and 91 will contact with the upper ends 124 of the supports, and raise them slightly so that by moving the lever 114, the pointed bars 107 and 109 will be forced lengthwise so that the dogs 96 and 97 will be withdrawn from engagement with the supports 121 thereby liberating the supports. The platen is then lowered which will allow the supports 121 to be lowered and consequently the upper flask section is lowered onto the lower flask section 131 after which the platen 36 is rocked by hand, Fig. 13, which will cause the projections 119 and 120 to contact with the projections 127 extending from the supports 121 thereby moving the supports free of the studs 130 which will allow the supports to be raised until they engage the dogs 96 and 97 when they will be held suspended. The platen is then lowered into working position, as in Fig. 12, and locked by the plunger 39 entering one of the openings 40 in the platen.

The hooks 54 are moved in connection with the upper flask section by the lever 41 acting on the rod 48 through the link 50. While the upper flask section is suspended by the supports 121 it is turned over so that, that face which was in contact with the platen will be turned down on top of the lower flask section. It is understood that the patterns are connected to the platens so that when the flask sections are disengaged from the platens they will be withdrawn from the patterns. By this arrangement a lower and upper flask section are filled at the same time, and the machine is rotated a half turn so that the upper flask section will be brought over the lower flask section, and two men are working at the machine at the same time.

I claim as my invention.

1. A molding machine comprising a pivotally supported frame, guides depending from each end of the frame, platens located in the guides and adapted to support flask sections, means for raising and lowering the platens in said guides, each platen capable of an oscillatory movement, and means for holding the platens from such movement.

2. A molding machine comprising a pivotally supported frame, a platen supported at each end of the frame, racks depending from the frame, gears meshing with the racks and connected with the platens, means for rotating the gears and dogs for holding the gears against rotation.

3. A molding machine comprising a pivotally supported frame, guide-ways depending from the frame, guides located therein, a platen carried by said guides and capable of an oscillatory movement, carriers adapted to be carried by the guides, means for holding the carriers in an inoperative position, and means for raising and lowering said guides.

4. A molding machine comprising a pivotally supported frame, guide-ways depending from the frame, guides located therein, a platen carried by said guides and adapted to support a flask section, carriers adapted to be carried by said guides, means for holding the carriers in an inoperative position, the carriers when carried by the guides adapted to support said flask section, and means for raising and lowering said guides.

5. A molding machine comprising a pivotally supported frame, a platen supported by the frame, means for raising and lowering the platen, a flask section adapted to be connected to the platen, supports connected to the frame and receiving the flask section from the platen, means for releasing the supports into engagement with the platen in order that the platen and supports may be moved together.

6. A molding machine comprising a pivotally supported frame, guides supported by the frame, a platen supported by the guides and adapted to support a flask section, supports carried by the frame, means for releasing the supports whereby said supports are allowed to be carried by said guides and adapted to carry said platen, and means for raising and lowering said guides.

7. A molding machine comprising a pivotally supported frame, guides supported by the frame, a platen supported by the guides and capable of an oscillatory movement and adapted to support a flask section, supports carried by the frame, means for releasing the supports whereby they are allowed to be carried by said guides and adapted to carry said platen, means for raising and lowering said guides, and means for disengaging the supports from said platen.

8. A molding machine comprising a pivotally supported frame, a platen supported by the frame and adapted to support a flask section, clamp arms adapted to engage the flask section, a frame-work adapted to support the arms, and means for raising and lowering said frame-work, whereby the arms are brought to engage and disengage said flask section and platen.

9. A molding machine comprising a pivotally supported frame, platens supported at each end of the frame and adapted to support flask sections, means for raising and lowering the platens, means for placing one of the flask sections in a position released from its platen, supports carried by said frame adjacent the other platen, means for releasing the supports, thereby allowing them to carry the second flask section released from its platen and place it upon the first flask section, the flask sections being then in a condition for pouring.

In testimony whereof I have hereunto set my hand in presence of two subscribing witnesses.

OSCAR W. JOHNSON.

Witnesses:
 A. O. BEHEL,
 E. D. E. N. BEHEL.